United States Patent
Miyoshi

[11] Patent Number: 5,908,093
[45] Date of Patent: Jun. 1, 1999

[54] BAG MOUNTED WITH CASTERS

[75] Inventor: Etsuo Miyoshi, Okawa-gun, Japan

[73] Assignee: Swany Corporation, Kagawa, Japan

[21] Appl. No.: 08/965,453

[22] Filed: Nov. 6, 1997

[30] Foreign Application Priority Data

Nov. 8, 1996 [JP] Japan .................................. 8-312735

[51] Int. Cl.⁶ ................................................ A45C 13/00
[52] U.S. Cl. ......................... 190/115; 190/18 A; 16/115
[58] Field of Search ............................ 16/115; 190/115, 190/117, 18 A

[56] References Cited

U.S. PATENT DOCUMENTS

| | | |
|---|---|---|
| 4,792,025 | 12/1988 | Thomas . |
| 4,995,487 | 2/1991 | Plath . |
| 5,253,739 | 10/1993 | King ................................... 190/115 X |
| 5,407,040 | 4/1995 | Hu . |
| 5,464,081 | 11/1995 | Zwanzig ................................. 190/115 |
| 5,469,945 | 11/1995 | Jserng ..................................... 190/115 |
| 5,547,052 | 8/1996 | Latshaw .............................. 190/115 X |
| 5,575,361 | 11/1996 | Chou ................................... 190/115 X |
| 5,588,513 | 12/1996 | Lin . |
| 5,642,552 | 7/1997 | Wang ................................... 190/115 X |

FOREIGN PATENT DOCUMENTS

| | | |
|---|---|---|
| 57-179824 | 11/1982 | Japan . |
| 63-131634 | 8/1988 | Japan . |
| 4-76686 | 12/1992 | Japan . |

Primary Examiner—Gary E. Elkins
Assistant Examiner—Tri M. Mai
Attorney, Agent, or Firm—Wenderoth, Lind & Ponack, L.L.P.

[57] ABSTRACT

A bag including a freely opening and closing bag body, casters mounted to a bottom face of the bag body, a handle having a grip at upper extremities of extensible rods mounted on the bag body in a free extensible manner, and stoppers for locking the handle in a fully extended position and in a fully retracted position. The grip, when pulled up from the bag body, is positioned between right and left sides of the upper face of the bag body and extends in a direction of the long side of the bag. The extensible rods of the bag body are fixed to the top and the bottom of a lateral face of the bag body, and the extensible rods are also curved to position the grip between the right and left sides of the bag body, when in the pulled-out condition. Also, the external face of the bag body connecting the extensible rods can be formed in a slanted or oblique orientation.

14 Claims, 11 Drawing Sheets

FIG. 1

PRIOR ART

BAG MOUNTED WITH CASTERS

BACKGROUND OF THE INVENTION

The present invention relates to a bag mounted with casters, and especially to a bag having a handle that can move up and down. The bag of the present description is used in the broad meaning of suitcases and attache cases.

Figure 1:
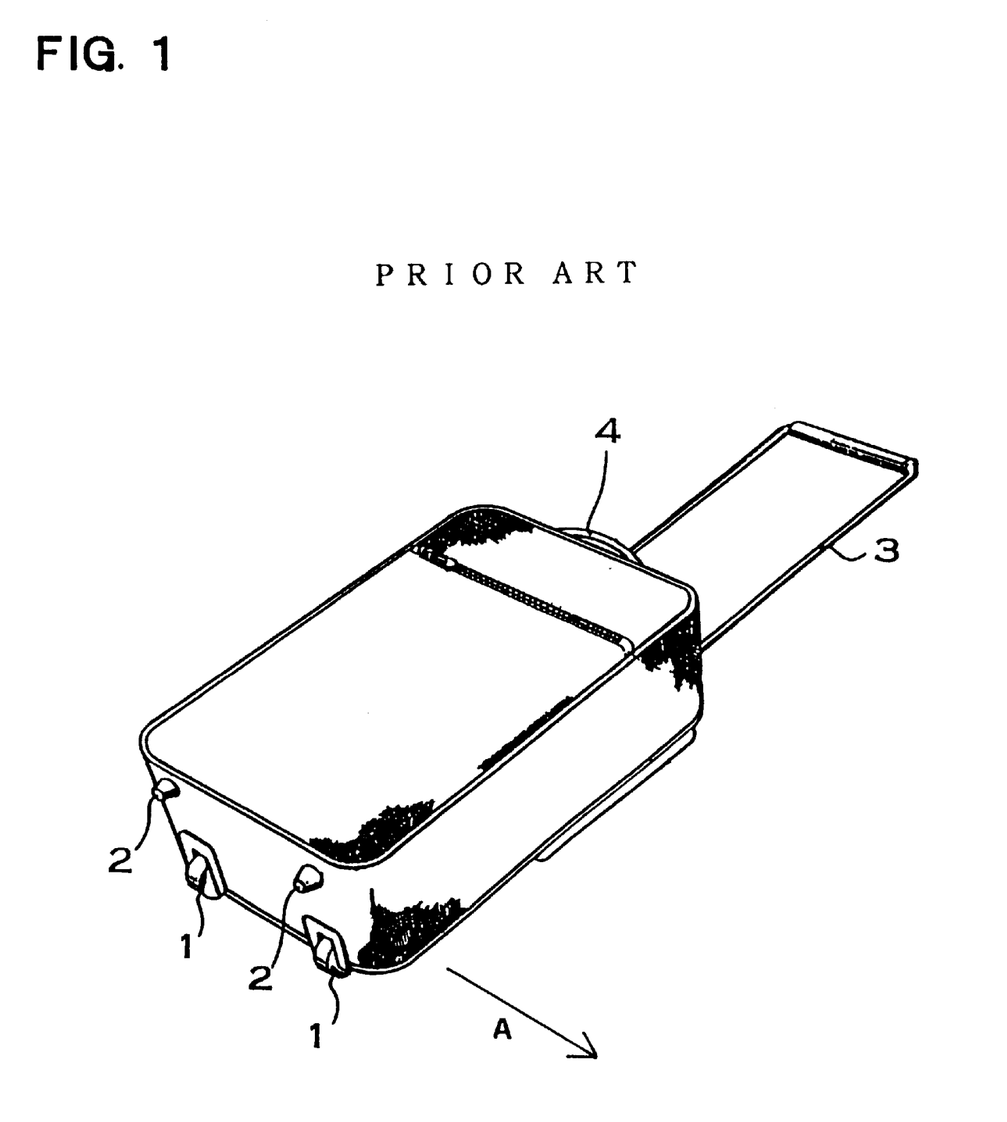
FIG. 1 is a perspective view showing a prior art bag with casters.

Bags provided with casters and a freely extensible handle have already been developed and widely used. There are many bags of this structure which are sized to allow the bag to be boarded on planes or the bag may be of a somewhat larger size. On very large bags, the handle is directly fixed to the bag so as to allow easy movement thereof. Then, the small bags are mounted with a freely extensible handle that is pulled up in order to allow the bag to be easily moved. For example, bags of this structure have been mentioned in U.S. Pat. No. 4,995,487; Japanese Patent Publication 4-76686 issued Dec. 4, 1992; Japanese non-examined Utility Model Publication No. 57-179824 issued Nov. 15, 1982 and Japanese non-examined Utility Model Publication No. 63-131634 issued Aug. 29, 1988. The bags mentioned in these publications are provided with two casters 1 mounted on one side of a bottom face of the bags as shown in FIG. 1. A pair of short legs 2 are fixed on the opposite side of the bottom face with respect to the casters 1. When the bag is in a vertical orientation, the casters 1 and the legs 2 are in contact with the floor. In this condition, because the legs 2 do not turn and are in contact with the floor, the bag can stand upright without moving. Further, an extensible handle 3 is provided at an upper face of the bag to allow the bag to be pulled. The casters 1 are mounted on the same side of the bag as the handle because the bag is pulled while in a slanted or a tilted orientation.

As shown in FIG. 1, the bag can be moved when it is tilted and pulled by the handle 3. When the bag is tilted, the casters 1 remain in contact with the floor and the legs 2 leave the floor. When the handle 3 is pulled in this condition, the casters 1 turn thereby making the bag easy to move. However, with the bags that move in this fashion, the casters 1 cannot sometimes be used in narrow places such as in the inside of a plane cabin or in a crowded area. When the bag is moved with the casters 1, the widest dimension of the bag is oriented perpendicular to the direction of travel. Therefore, the bag cannot be moved freely in the aisles between the seats in the cabin of a plane, or in crowded areas. When the casters 1 cannot be used, it is necessary to lift the bag and to carry it by hand. When the bag is lifted up and carried by hand, it is then possible to move the bag in the direction shown by arrow A in FIG. 1.

The bag mounted with casters has a convenient structure which allows heavy bags to be moved easily. This is because even if the bag is heavy, it can be pulled easily while rolling on the casters. In order to solve the drawbacks of the prior art, the present inventor has developed the bag structure shown in FIG. 2. The bag shown in FIG. 2 has casters 21 fixed at the bottom face of bag body 24. To allow the bag body 24 to stand by itself in an upright position, the casters 21 are mounted at the four corners of the bottom face, respectively. A grip 23A of a handle 23 is located at the middle between the right and left sides of the upper face of the bag body 24. In contrast to the bag shown in FIG. 1, the bag shown in FIG. 2 can be moved with tilting the bag body. As shown by the arrow in the FIG. 2, the bag is moved while standing in a vertical position. When it is moved in the direction shown by the arrow, it can be moved with a narrow width of the bag body oriented perpendicular to the direction of travel. For this reason, the bag shown in FIG. 2 has the advantage that it can be conveniently moved in plane cabins or crowded areas. Furthermore, the bag can be freely moved in any direction by using free casters, which swiveling in any direction, for the four casters 21. Also, the upright bag does not transmit the bag weight to the handle 23. Therefore, even a fairly heavy bag can be easily pushed and moved.

Figure 2:
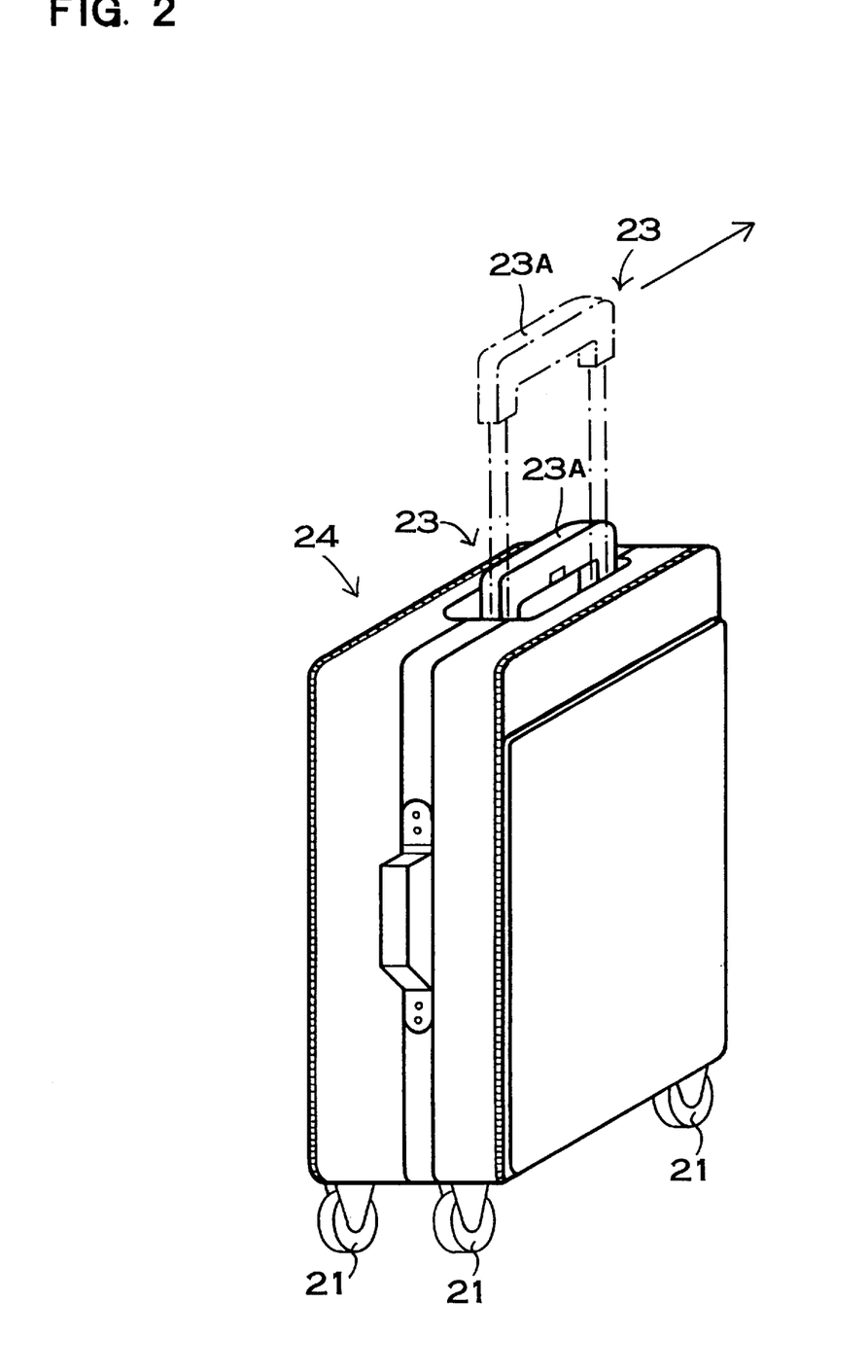
FIG. 2 is a perspective view of a bag formerly developed by the present inventor.
Figure 3:
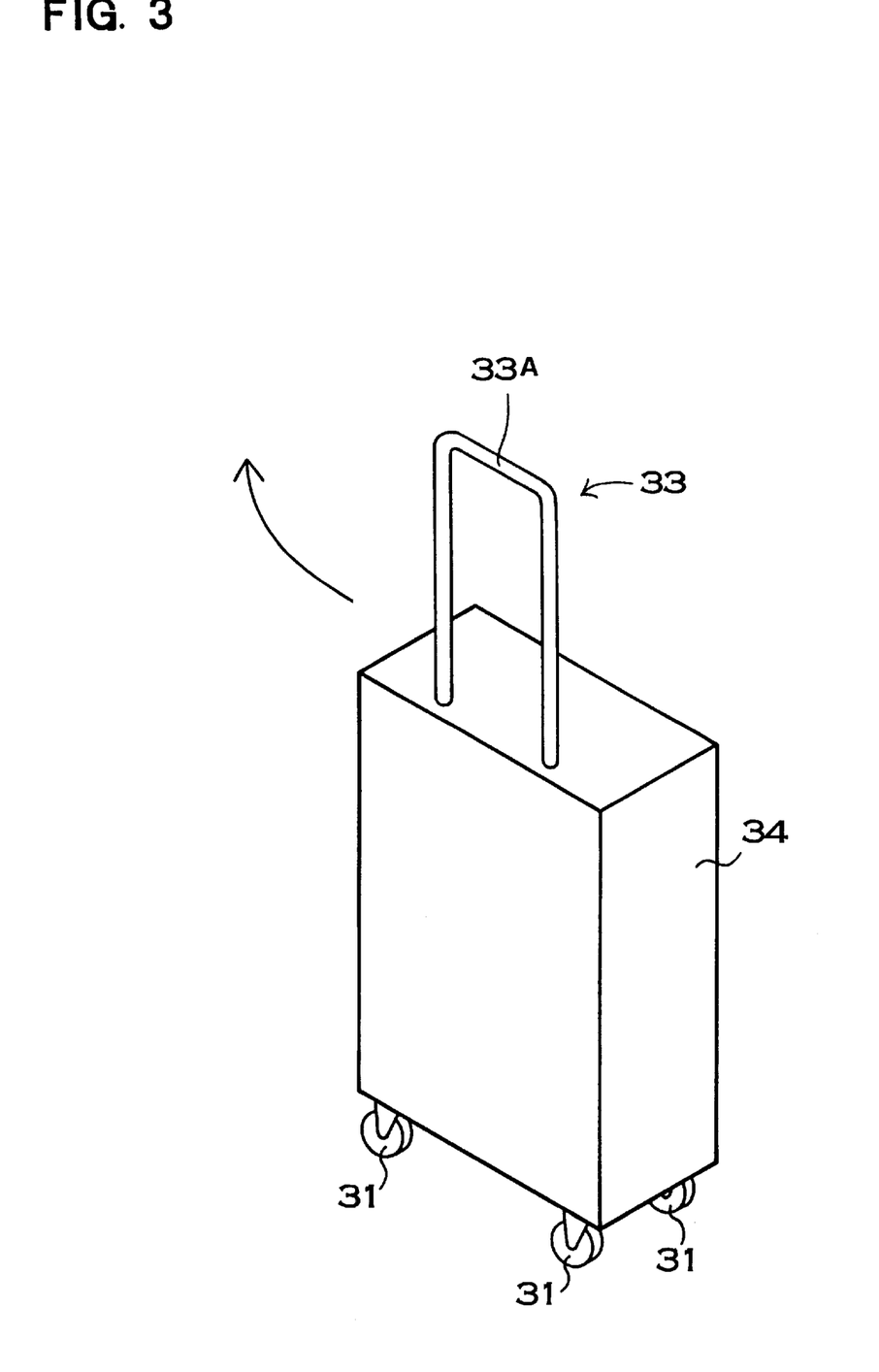
FIG. 3 is a perspective view showing a moving condition of a bag mounted with a handle provided on one side of the bag body.

The bag shown in FIG. 2 can be lightly and easily moved on its four casters by pushing the grip of the handle. However, with a bag of this structure it is necessary to place the grip of the handle at the middle of the bag body, i.e. between the right and the left sides of the bag body. As shown in FIG. 3, if a grip 33A is fixed to one side of the bag body 34 having free swiveling casters, the bag will move and turn when it is pushed as shown by the arrow in FIG. 3. Therefore, when the grip 33A is fixed to one side of a bag mounted with free swiveling casters 31, the grip 33A has to be firmly held in order to move the bag in a straight forward direction. This is because bags that tend to turn, are moved while strongly holding the grip 33A in order to correct the direction of movement. Therefore, the drawback of the bag of FIG. 3 is that the bag cannot be easily moved while lightly holding the grip 33A.

Figure 4:
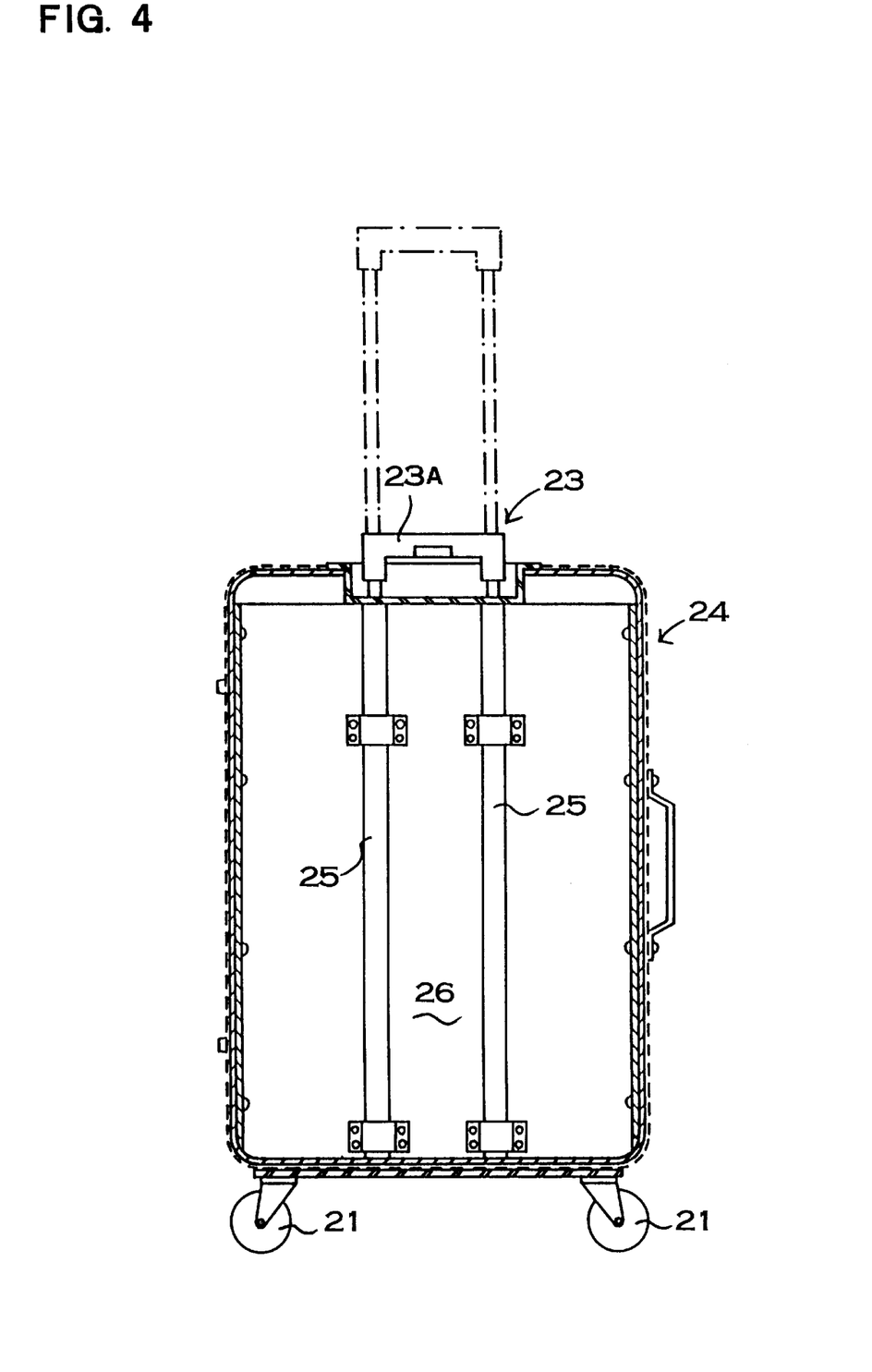
FIG. 4 is a vertical cross-sectional view of the bag shown in FIG. 2.

As shown in the cross sectional view of FIG. 4, with the bag mounted with the handle at the middle of the upper face of the bag body, it is necessary to fix extensible rods 25 of the handle 23 to the inside of the bag body 24. To place the grip 23A at the middle between the right and left sides of the bag body 24, the extensible rods 25 are fixed by penetrating through the middle between the right and left sides that is to say the direction of the thickness of the bag body 24. With a bag of this structure, the extensible rods 25 will make efficient use of the inside of the bag body 24 difficult. To solve as much as possible the problems associated with the extensible rods 25, the present inventor has provided a partition panel 26 in the bag body 24 and thus has invented a bag with the extensible rods 25 fixed to this partition panel 26. The bag is designed to open on both sides so as to allow items to be placed in the bag on both sides of the partition 26. In the bag of FIG. 4, the partition panel 26 reinforces the bag body 24 and also divides the bag body into two compartments thereby making the bag more convenient. However, the drawback of having the extensible rods 25 hindering inside the bag body 24 is still not solved. Especially, the drawback of the bag body 24 becoming shallower, thus preventing the placement of thick items therein, cannot be solved.

The present invention has been developed with the aim of solving these drawbacks, and an important object of the present invention is to provide a bag mounted with casters and having the extensible rods mounted in a position where they will not hinder efficient placement of items inside the bag body, even when the grip is mounted between the right and left sides of the bag body.

SUMMARY OF THE INVENTION

The present invention includes a bag mounted with casters, and a bag body that can be freely opened and closed. The casters can roll in any direction and are mounted at the four corners of a bottom face of the bag body. The handle has a grip mounted at upper extremities of extensible rods which are mounted in the bag body in a freely extensible manner. Also, stoppers are provided to lock the handle in a position where it is pulled out from the bag body and a position where it is pushed into the bag body. The grip is positioned at the middle of the upper face of the bag body between the right and left sides of the bag body and is set in the same direction as the long side direction of the upper face of the bag body.

Furthermore, the bag fixes the extensible rods of the handle to a lateral face of the bag body allowing upward and downward extension of the handle. In the condition where the grip of the upper extremity is pulled up, the extensible rods are curved so as to be located at the middle of the upper face between the right and left sides of the bag body. When the curved extensible rods are pushed in or retracted, they are located in the lateral face of the bag body, and when the rods are extended, the grip is fixed at the upper extremities of the rod at the middle of the upper face between the right and left sides of the bag body. The bag of the present invention, locates the grip at the middle between the right and left sides of the bag body by means of the extensible rods which are curved in the extended position.

The bag of the present invention not only fixes the extensible rods of the handle to the lateral face of the bag body, but also, when the extensible rods are pulled out, the grip can be placed at the middle between the right and left sides of the bag body. For this reason, the extensible rods of the handle are placed in a location where they will not interfere with placement of items in the bag interior, and the object of providing a bag which can be easily moved in any desired direction while lightly holding the grip is realized.

The above and further objects and features of the present invention will more fully be apparent from the following detailed description proved in conjunction with the accompanying drawings.

DETAILED DESCRIPTION OF THE INVENTION

Figure 5:
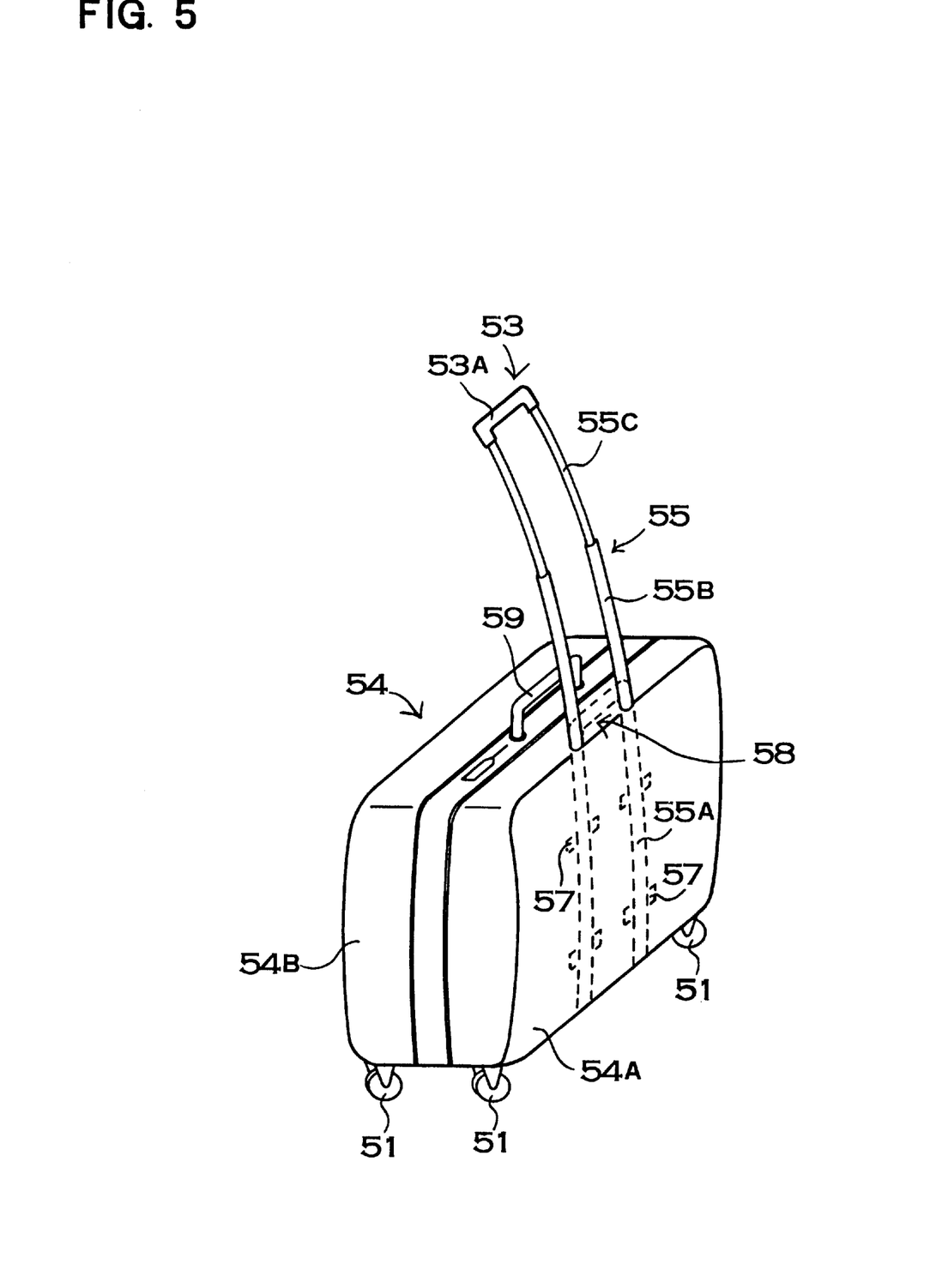
FIG. 5 is a perspective view of a bag according to an embodiment of the present invention.
Figure 6:
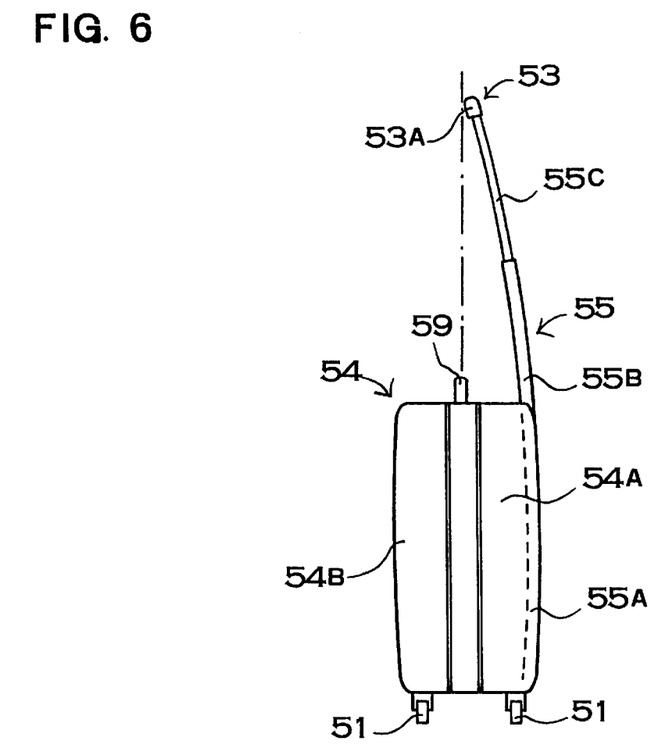
FIG. 6 is a front view of the bag shown in FIG. 5.

In a bag shown in FIGS. 5–6, casters 51 are fixed to a bottom face of a bag body 54. Further, an extendable handle 53 is mounted in a lateral face of the bag body 54.

The bag body 54 is composed of a body 54A and a cover 54B. The cover is connected to the body 54A through wing nuts (not shown) so as to allow opening and closing of the bag. The bag body 54 including the body 54A and the cover 54B is made of a hard material with sufficient resistance, such as for example, a part made by bonding and hardening hard plastic, ABS resin, etc. and fiber with a binder; a part made of water-proof paper with a painted surface; a part made of metal such as aluminum. The bag body 54 shown in FIG. 5 is composed of ABS resin that is hard plastic reinforced with a reinforcement frame fixed at the opening part. The reinforcement frame may be made of, for example, aluminum. The opening part of cover 54B is also reinforced by fixing a reinforcement frame. The bag body 54 is designed with sufficient thickness so as to not deform when fairly heavy items are placed in the bag.

The bags are of a cabin type, so as to be allowed in a plane cabin, and of a large size type which is commonly used for travel. The cabin type bag is slightly smaller than the maximum size allowed on board planes, casters included. At present, (in Japan) the maximum size of the bags allowed on board planes is fixed at 50 ×35×20 cm. Therefore, the outer dimensions of the cabin type bag are smaller that the upper-mentioned dimensions. Furthermore, to make the bag self-standing in an upright position and to make it move easily with a large amount of items inside, the thickness is best set at over 10 cm and the width at over 20 cm. The size of the bottom face of the bag should be preferably over 10×20 cm to allow for stable movement of the bag while in a vertical or upright position. The large size cabin type bag allows the storage of many items, has a width of 20 cm and a side dimension of 35 cm. The cabin type bag is relatively compact and has a width of 15 cm and a side dimension of 25 to 30 cm. With caster included, the overall height of the cabin type bag is under 50 cm. The compact type bag has a bag body and cover height of 30 to 35 cm. The large travel bag, that is not a cabin type, has a bottom face width of 20 to 40 cm, a side width of 1.5 to 3 times and a height of 40 to 60 cm.

Figure 7:
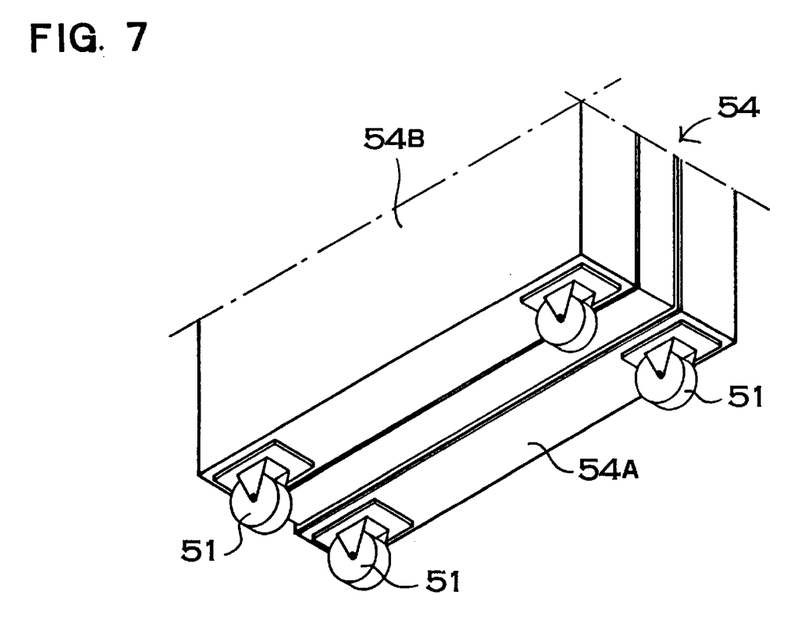
FIG. 7 is a perspective view of a bottom face of the bag shown in FIG. 5.

As shown in the bottom view of the FIG. 7, the casters 51 are fixed in the vicinity of the four corners of the bag body 54. The casters 51, usually called universal casters, are used because they can freely swivel. Two casters 51 are fixed to the body 54A and two are fixed to the cover 54B of the bag as shown in FIG. 7.

The handle 53 has an overall U-shape and includes a horizontal grip 53A connected at the extremities of two extensible rods 55. The extensible rods 55 are rods that can be extended in two or three segments. In the extensible rods that can be extended in three segments, intermediate rods 55B are inserted into guide pipes 55A to allow inward and outward movement of the intermediate rods. Also, upper rods 55C are inserted in the intermediate rods 55B to allow inward and outward movement of the upper rods.

As shown in the FIGS. 5 and 6, the three segment extensible rods 55 are curved so that the grip 53A when fully extended upwardly, is positioned at the middle of the bag upper face between the right and the left sides of the bag body 54. The two extensible rods 55 that are connected to both extremities of the grip 53A, are curved with the same bending radius gradient. Further, the guide pipe 55A, the intermediate rod 55B and the upper rod 55C that form one extensible rod 55, are curved with the same bending radius gradient so as to allow upward and downward nesting motions. That is to say, all the rods are curved with the same bending radius gradient.

The bending radius gradient of the extensible rods 55 is designed so that the grip 53A, when fully extended, is positioned approximately between the right and the left sides of the bag body 54. Therefore, the bending radius gradient of the extensible rods 55 is decided according to the height of the grip 53A and the thickness of the bag body 54. The thicker the bag body 54 is, the smaller the bending radius gradient is and the thinner the bag body 54 becomes, the larger the bending radius gradient becomes. The height of the grip 53A is designed to be between about 80 and 85 cm, in order to allow easy hand pushing of the bag while in a vertical position.

The guide pipes 55A of the extensible rods 55 are fixed in an upward and downward extensible manner at the side of the body 54A. The guide pipes 55A are fixed to the inner face of the body 54A through the attachments 57 which may include metallic saddles or the like. The metallic saddle attachments 57 fix the extensible rods 55 to an inner face of the bag body 54 by mean of rivets or bonding. To allow fixing of the guide pipes 55A along the inner face of the bag body 54, the bag shown in the FIG. 5 is designed so that the bag body 54 is curved with a bending radius close to the one of the guide pipes 55A. Because the extensible rods 55 are fixed to the inner face of the bag body 54, the extensible rods 55 are inserted through the upper face of the bag body 54 as shown in FIGS. 5–6. The extensible rods can also be fixed to the external face of the bag body, although this arrangement is not shown.

The handle 53 is pulled out from the bag when the bag is moved while supported on casters 51. When the bag is not supported on casters 51, the handle 53 is pushed into the bag. When the handle 53 is pushed into the bag body 54, the handle is designed to form a grip aperture between the upper face of the bag body 54 and the grip 53A. A central part of the grip 53A is folded upwardly and forms the grip aperture between the upper face of the bag body 54 and the grip 53A, when the grip 53A is pushed toward the bag body 54. When the grip 53A is pushed inwardly to the maximum extent, the bag can be held by the pushed-in grip 53A. For example, in this condition, sitting in a train or on a chair, the bag is conveniently used when moved.

However, when the grip 53A of the bag is pushed in, the bag is lifted a central grip 59 that is mounted at the center of the bag body 54. Because the central grip 59 is placed at the middle between the right and the left sides, the bag body 54 can be handheld with a good right/left balance.

The three segment handle 53 is locked by stoppers at the maximum pulled-out or extended position from the bag body 54, and at the maximum pushed-in or retracted position. The handle 53 is locked in the pulled-out position so that one can lean on the grip 53A while easily moving the bag supported by casters 51 by push the bag while leaning on the grip 53A, that is to say the bag can function as a walking stick. When the bag is used in this manner, the stoppers lock the handle 53 to prevent it from being pushed into the bag. The handle 53 is pushed into the bag and locked when the bag is being transported, or carried by the central grip 59.

Figure 8:
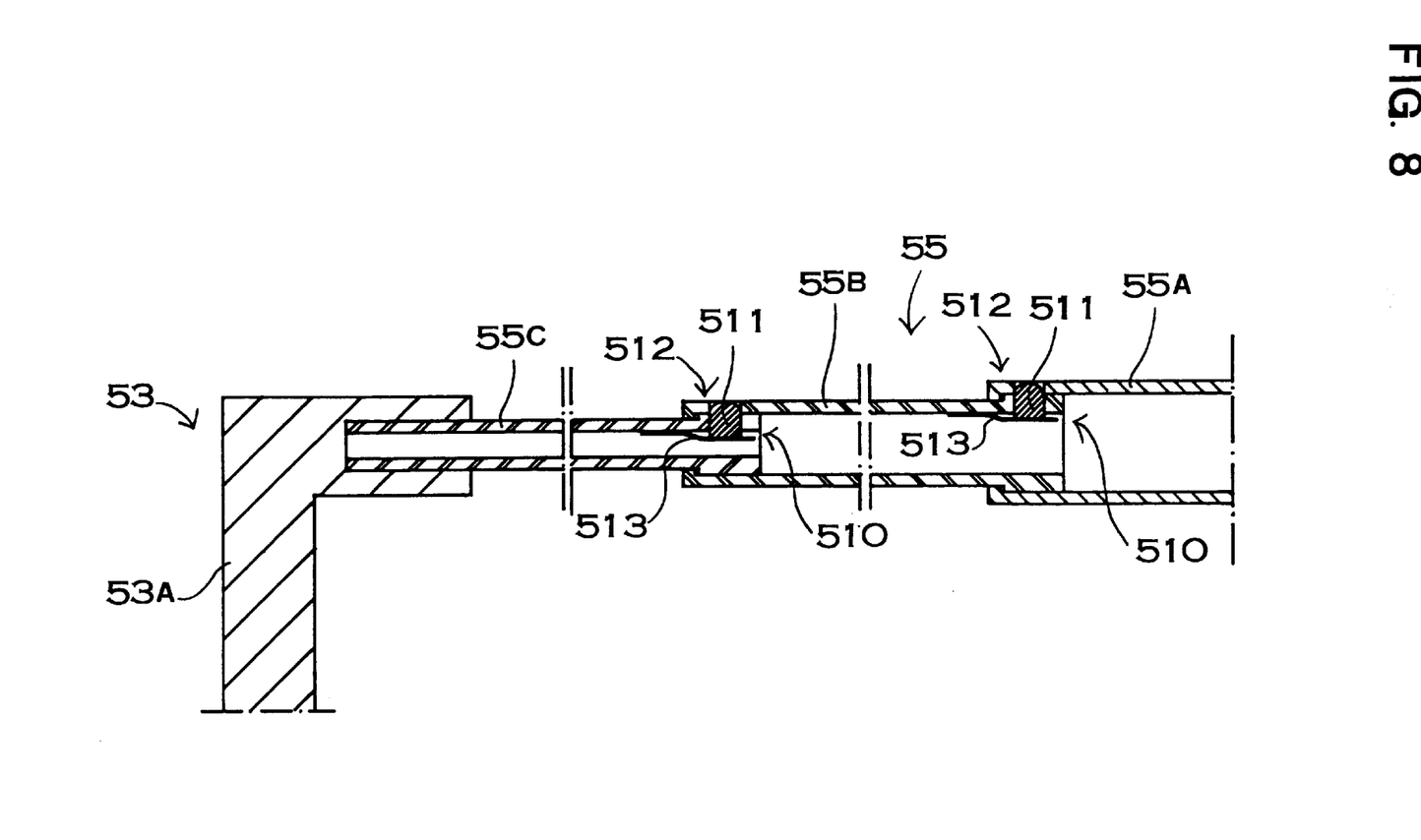
FIG. 8 is a cross sectional view showing one example of a stopper of another embodiment of the present invention.

Any device can be used as stoppers to lock the extension of the extensible rods 55. FIG. 8 shows an example of stoppers which can be used in conjunction with the extensible rods. The stopper shown in FIG. 8 is composed of a protruding pin 511 disposed in a slot 512 and connected between the lower extremity of the upper rod 55C and the upper extremity of the intermediate rod 55B. The pin 511 is elastically pressed or biased into the slot 512. Protruding pins 511 are mounted at the lower extremities of the upper rods 55C and the lower extremities of the intermediate rods 55B through an elastic material 513. A protruding pin 511 protrudes elastically from the upper rod 55C and from the intermediate rod 55B. The slots 512 are provided in the intermediate rods 55B and the guide pipes 55A. The slots 512 are opened so that the protruding pins 511 can be inserted into the upper rods 55C and the intermediate rods 55B when they are in the fully pulled-out or fully pushed-in condition. When the upper rods 55C and the intermediate rods 55B are fully pushed in or fully pulled out, and when the protruding pin 511 is inserted into the slot 512, the extension of the upper rods 55C is locked. When the extensible rods 55 are strongly extended, the elastic material that connects the protruding pin 511 deforms and the extensible rods can be extended.

The extensible rods 55 can be locked in the desired positions by the use of the stoppers 510 of the here-above described structure. However, the bag of the present invention can mount a stopper provided with a control device in the grip that releases the locked condition. This stopper locks the extension of the extensible rods in the fully pulled-out or in the fully pushed-in condition. The control device is used to release the locked condition. Also, an advantage of this stopper is that the extension of the extensible rods is securely locked in position.

When the grip 53 is in the fully pulled-out condition, the overall length of the extensible rods 55 is set so that the height from the lower end of the casters 51 to the grip 53A, is about 80 to 85 cm. It is possible to have a range of heights from 60 to 100 cm from the lower end of the casters to the grip. When the height of the grip 53A is set at about 80 cm, the bag is most easily moved by pushing. The grip 53A that is connected at the upper extremities of the extensible rods 55, is a grip that extends in the direction of the long side of the upper face of the bag. The grip 53A is maintained in a horizontal position by extending the two extensible rods 55 by the same length.

Figure 9:
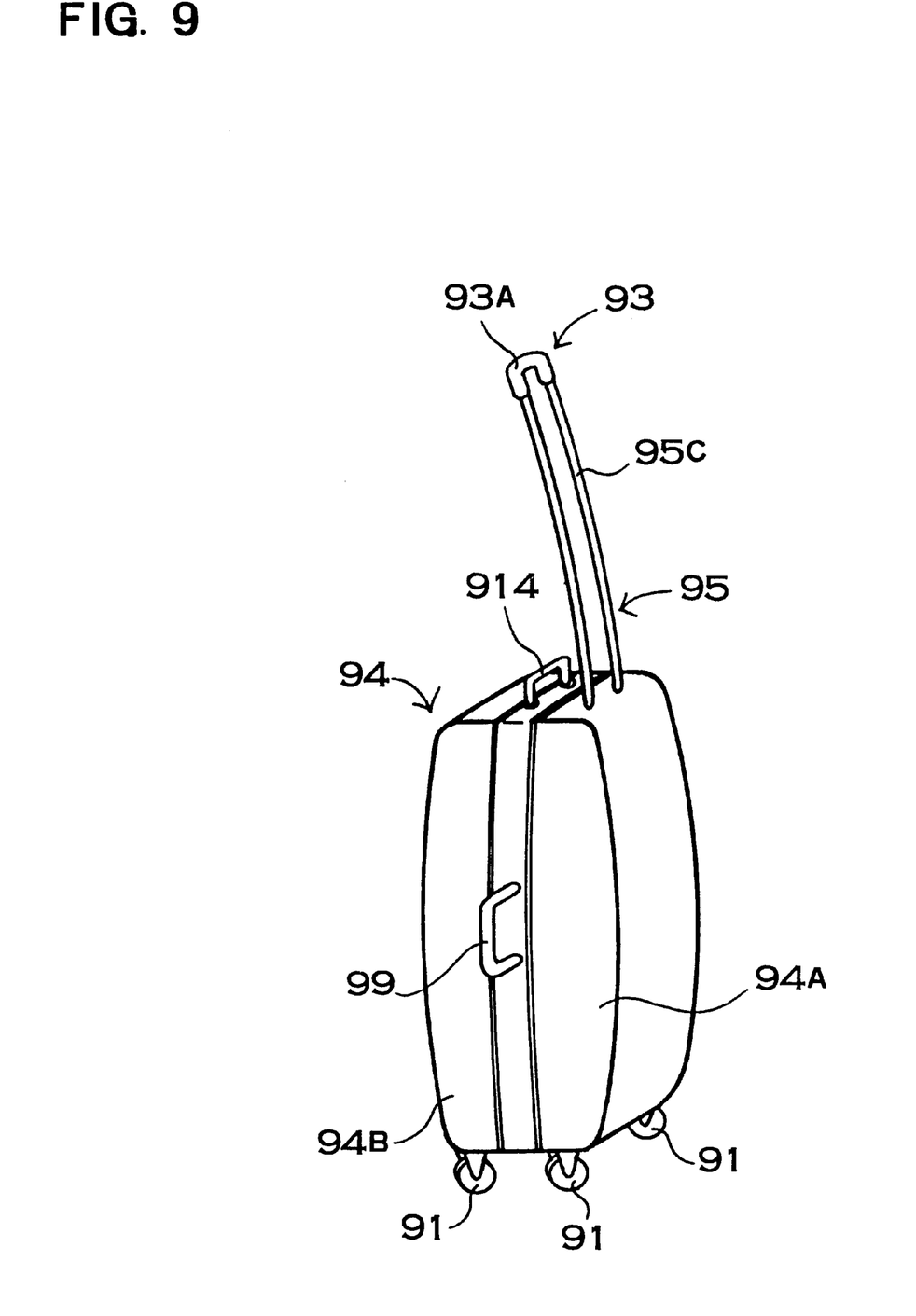
FIG. 9 is a perspective view of a bag according to another embodiment of the present invention.
Figure 10:
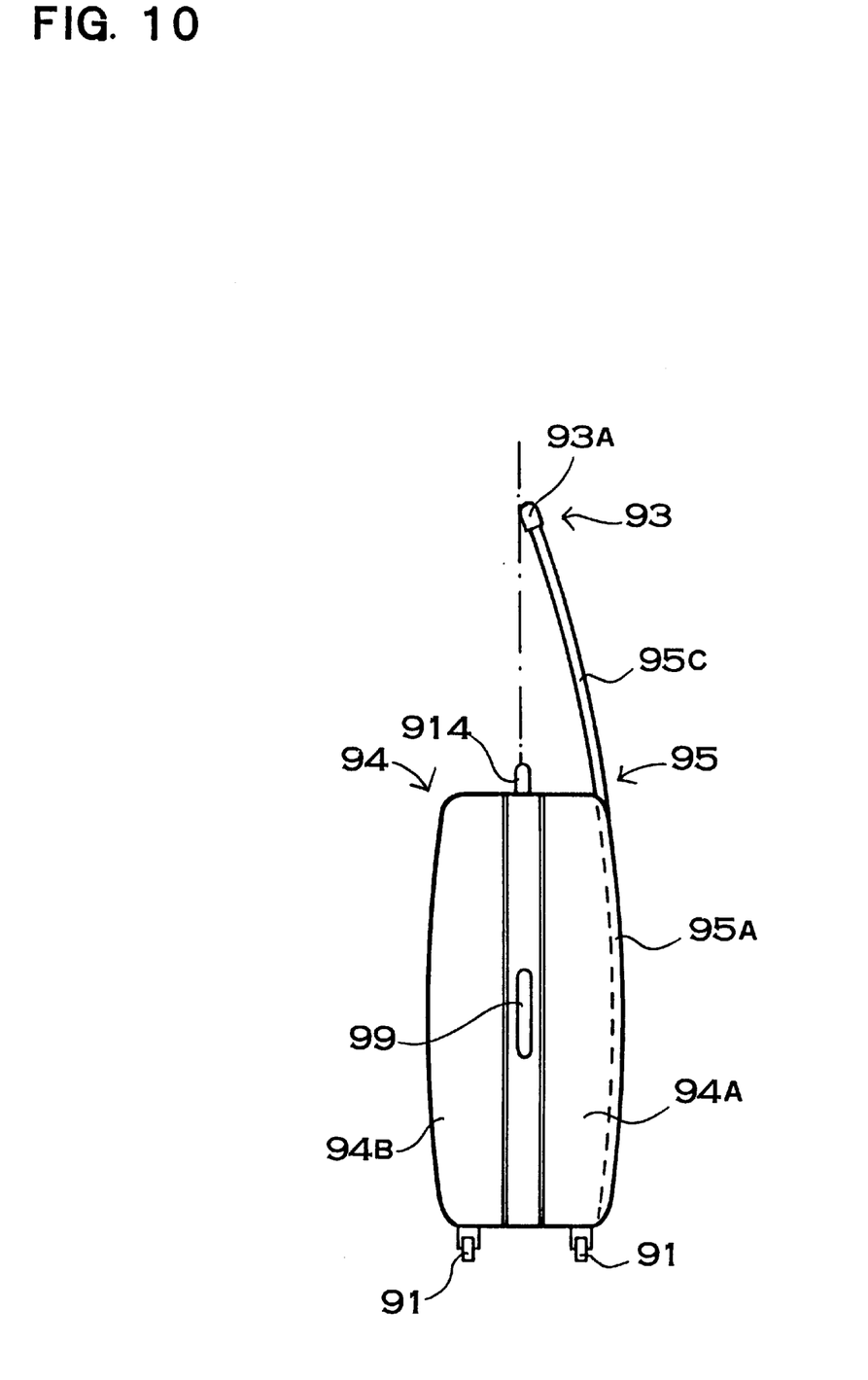
FIG. 10 is a front view of the bag shown in FIG. 9.

Furthermore, the bag shown in FIG. 9 and FIG. 10 has a structure that allows movement in the direction of length of the bag while in an upright position. The casters 91 are fixed at the bottom face of the bag to allow the bag to be self-standing in an upright position. As shown in FIG. 2, extensible rods 95 including two segments are fixed to the bag body 94 of this bag. The upper rod 95C is inserted in the outside guide pipe 95A so that rod 95C can move inwardly and outwardly relative to the outside guide pipe 95A. The outside guide pipe 95A is fixed to an outer face of the body 94A. Upper extremities of the two extensible rods 95C are connected to the horizontal grip 93A thereby making a U-shape handle 93. The rods and are curved so that the grip 93A will be positioned, when extended, at the middle of the upper face between the right and left sides of the bag body 94. Each of the two extensible rods 95 have a guide pipe 95A and an upper rod 95C which are curved with exactly the same bending radius so that the upper rods can move freely in and out of the guide pipes without rubbing. Furthermore, the handle 93 is locked by stoppers (not shown) when in the fully extended condition and also when in the fully retracted condition. Further, the bag is provided with a central grip 914, mounted at the middle of the upper face between the right and left sides of the bag, to that the bag can be carried when the handle 93 is fully retracted. The bag can be used in a vertical position to principally allow use of the bag on board planes.

The bag shown in FIGS. 5 and 6, and in FIGS. 9 and 10 is provided with the handle 53, 93 that connects both extremities of the grip 53A, 93A to the extensible rods 55, 95. The handle 53, 93 is securely connected to the bag body 54, 94 and the grip 53A, 93A extends horizontally so as to connect together the two extensible rods 55, 95. However, the bag of the present invention does not specify the structure connecting the handle 53, 93 to the two extensible rods 55, 95. It is not shown in the drawings, but the grip of the handle can be connected to the bag body through one extensible rod. The grip that is connected to the bag body through one extensible rod, is connected to the bag body through an extensible rod that does not rotate. To prevent the extensible rod from rotating when connected to the bag body, the extensible rod is made with a square section, and the guide pipe is made of a square pipe that allows the insertion and withdrawal of the extensible rod while preventing relative rotation. The grip that is connected to the extensile rod that does not rotate, is fixed to the middle of the upper face of the bag between the right and left sides of the bag and extends in the direction of the long side of the bag.

Figure 11:
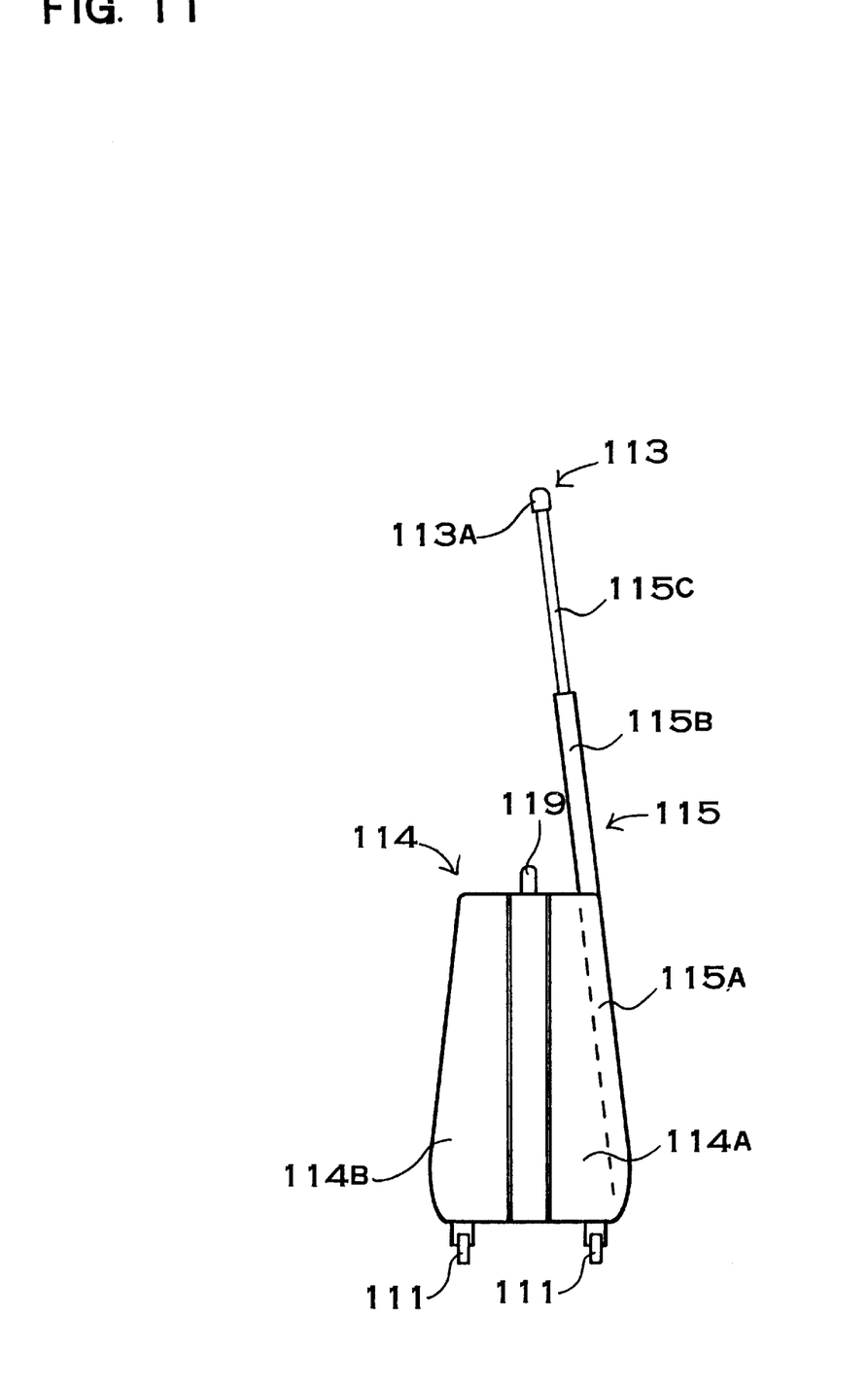
FIG. 11 is a front view of a bag of another embodiment of the present invention.

Furthermore, the bag shown in the FIG. 11, instead of using curved extensible rods, has a slanted external face of bag body 114 that positions the extensible rods 115 so that the pulled out grip 113A will be positioned at the middle of the bag body upper face between the right and left sides of the bag body 114. Since the face of the bag body 114 is slanted, the upper face of the bag body 114 is narrower than the width of the bottom face. The angle of the slanted face depends on the width of the bag body 114 and the height of the grip 113A. When the bag body 114 is made wider, the angle of the slanted face becomes larger relative to a vertical face. Also, the bag shown in FIG. 11 includes casters 111, a handle 113, a body 114A, a cover 114B, guide pipes 115A, intermediate rods 115B, upper rods 115C, and a central grip 119.

Figure 12:
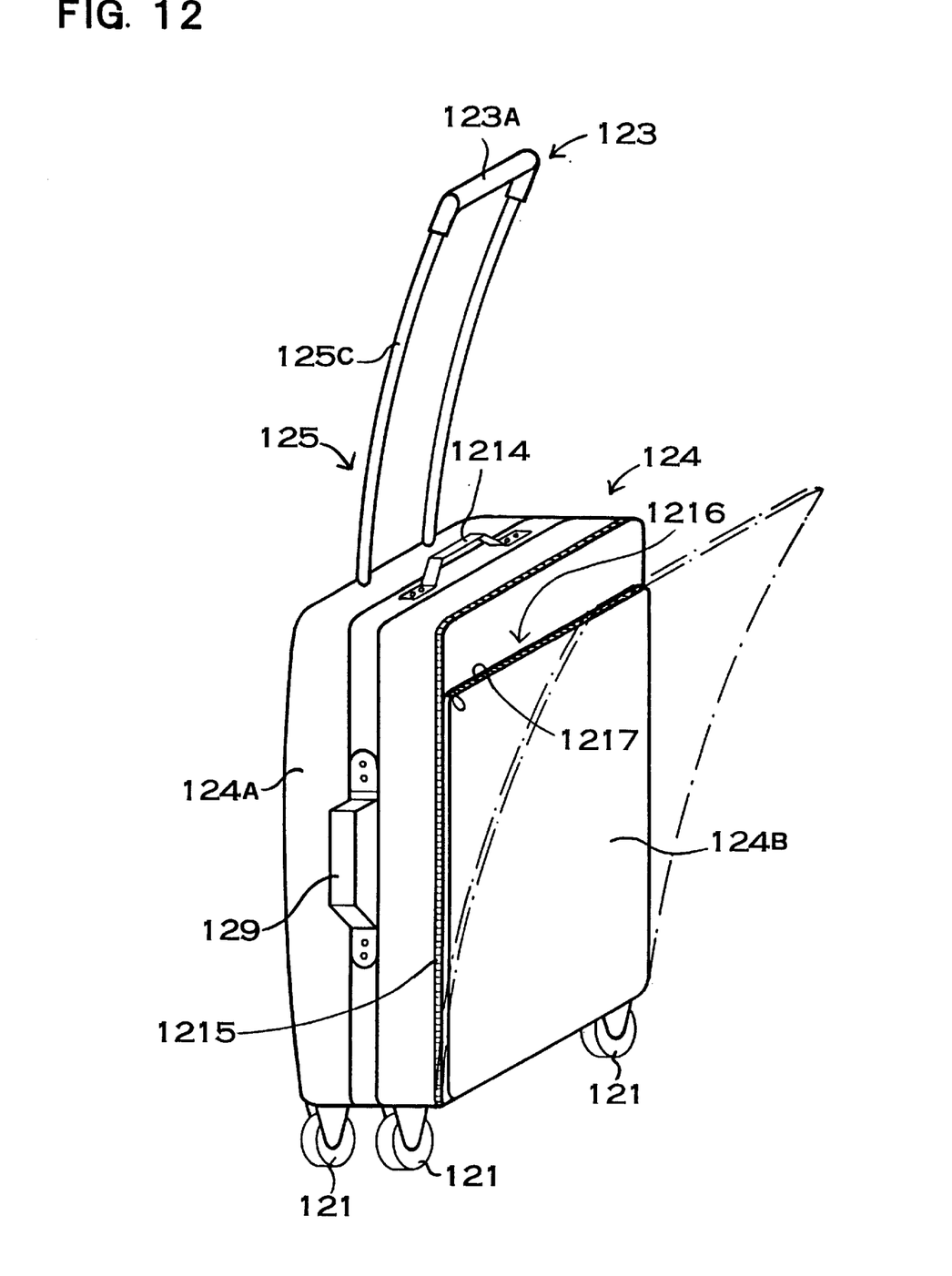
FIG. 12 is a perspective view of another embodiment of the present invention.

The bag of the present invention includes bag body composed of a hard material with a sufficient bag body resistance, but the present invention is not limited to specific materials which are hard. The bag of the present invention can also have a bag body made of soft material such as cloth or plastic sheets. A bag of this structure is shown in FIG. 12. The bag shown in FIG. 12 is designed with a bag body 124 made of a light soft material. For example, soft material which can be used include cloth, plastic sheet, natural or synthetic leathers. Also, these materials may be further sewed and decorated. A square reinforcement frame or a L-shape curved reinforcement panel is mounted in the inner face of the bag body 124 of the soft bags. The reinforcement frame and the reinforcement panel can be made of hard plastic and metal such as aluminum or the like.

Furthermore, the bag shown in FIG. 12 includes casters 121 at the bottom face of the bag body 124, and a handle 123 is fixed in an external face of the bag body in an extensible manner. A grip 123A connects the upper extremities of two extensible rods 125 which can extend in two segments. The handle has an overall U-shape. The extensible rods 125 can also be formed of a three segment device. The extensible rods 125 are fixed to the outer face of the body 124A of the bag body 124. The extensible rods 125 are fixed to the reinforcement frame or to the reinforcement panel mounted to the inner side of the bag body 124 by welding or by means of a device such as fastening saddles. Furthermore, the opposite side of the bag body is a cover 124B that can be opened and closed. The cover 124B is fixed to the lower edge to the body 124A so that it can be bent and folded. Both lateral edges and an upper edge of the cover are connected to the body 124A through a chuck or zipper 1215. The cover 124B is provided with a pocket on its surface and can be open or closed by chuck or zipper 1217. The pocket can be placed on the inner face of the cover or on the surface of the lateral side where the extensible rods are fixed. The bag in which bag body 124 is made of a soft material, is not only light-weight but can also be conveniently provided with the pocket 1216 provided on the bag body surface. In FIG. 12, the upper rod is numbered 125C and central grips are numbered 129, 1214.

As the present invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or the equivalence of such metes and bounds thereof are therefore intended to be embraced by the claims.

What is claimed is:

1. A bag comprising:

a bag body having a first lateral side, a second lateral side, an upper side connecting upper edges of said first and second lateral sides, and a lower side connecting lower edges of said first and second lateral sides, wherein said first lateral side forms a cover portion;

plurality of casters mounted on said lower side of said bag body;

a pair of curved extensible rods fixed to a face of one of said first and second lateral sides and extending through said upper side of said bag body, wherein each of said rods is curved along its length so as to longitudinally extend along a curved paths, and at least a portion of said curved length of each of said rods extends through said upper side of said bag body when said rods are in a retracted position;

a grip member having first and second ends which are connected to upper extremities of said pair of curved extensible rods, respectively, such that when said rods are fully extended, said curved extensible rods curve in a direction toward a central portion of said upper side of said bag body and said grip member extends along a longitudinal direction of said upper side of said bag body and is positioned over a portion of said upper side of said bag body; and a stopper mechanism which locks said extensible rods in a fully extended position and in a fully retracted position.

2. The bag as claimed in claim 1, wherein said one lateral side, to which said extensible rods are connected, is curved and has a bending radius gradient which is approximately equal to a bending radius gradient of said extensible rods.

3. The bag as claimed in claim 1, wherein said extensible rods are curved with the same bending radius gradient.

4. The bag as claimed in claim 1, wherein each of said pair of extensible rods comprises two segments and each of said two segments have equal bending radius gradients.

5. The bag as claimed in claim 4, wherein said two segments includes a guide pipe secured to a face of one of said first and second lateral sides, and an upper rod connected to said guide pipe so as to be movable toward and away from said guide pipe.

6. The bag as claimed in claim 1, wherein each of said pair of extensible rods comprises three segments and each of said three segments has an equal bending radius gradient.

7. The bag as claimed in claim 6, wherein said three segments includes a guide pipe secured to a face of said one of said first and second lateral faces, an intermediate rod movably secured to said guide pipe, and an upper rod movably secured to said intermediate rod.

8. The bag as claimed in claim 1, wherein each of said extensible rods comprises a guide pipe secured to a face of said one of said first and second lateral sides, and an upper rod connected to said guide pipe so as to be movable toward and away from said guide pipe.

9. The bag as claimed in claim 8, wherein said guide pipes are secured to an inner face of said one of said first and second lateral sides.

10. The bag as claimed in claim 1, wherein said plurality of casters comprises four casters, and each of said four casters is mounted on said lower side so that the caster can freely swivel about its mounting position and said bag body can be moved in any direction while being supported on said four casters.

11. The bag as claimed in claim 1, wherein said lower side is generally rectangular in shape, said plurality of casters comprises four casters, and each of said four casters is mounted in a corner portion of said lower side, respectively.

12. A bag comprising:
   a bag body having a first lateral side, a second lateral side, an upper side connecting upper edges of said first and second lateral sides, and a lower sidle connecting lower edges of said first and second lateral sides, wherein said first lateral side forms a cover portion;
   a plurality of casters mounted on said lower side of said bag body;
   a handle assembly including a pair of longitudinally-curved extensible rods fixed to a face of one of said first and second lateral sides and extending through said upper side of said bag body, and a grip member having first and second ends which are connected to upper extremities of said pair of longitudinally-curved extensible rods, respectively,
   wherein said handle assembly curves towards a central portion of said upper side when said handle assembly is moved to a fully extended position so that said grip member is positioned directly over a portion of said upper sides, and at least a portion of the curved length of each of said rods extends through said upper side of said bag body when said rods are in a retracted position; and
   a stopper mechanism which locks said extensible rods in a fully extended position and in a fully retracted position.

13. The bag as claimed in claim 12, wherein said one lateral side, to which said extensible rods are connected, is curved and has a bending radius gradient which is approximately equal to a bending radius gradient of said extensible rods.

14. The bag as claimed in claim 12, wherein said extensible rods are curved with the same bending radius gradient.

* * * * *